United States Patent
Liebsch et al.

(10) Patent No.: US 8,817,703 B2
(45) Date of Patent: Aug. 26, 2014

(54) METHOD FOR FACILITATING COMMUNICATION IN A MOBILE COMMUNICATION SYSTEM AND MOBILE COMMUNICATION SYSTEM

(75) Inventors: Marco Liebsch, Heidelberg (DE); Paulo Ferrer Loureiro, Heidelberg (DE); Stefan Schmid, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 660 days.

(21) Appl. No.: 13/057,530

(22) PCT Filed: Aug. 4, 2009

(86) PCT No.: PCT/EP2009/005635
§ 371 (c)(1),
(2), (4) Date: Mar. 28, 2011

(87) PCT Pub. No.: WO2010/015377
PCT Pub. Date: Feb. 11, 2010

(65) Prior Publication Data
US 2011/0176488 A1    Jul. 21, 2011

(30) Foreign Application Priority Data
Aug. 4, 2008   (EP) .................................... 08013893

(51) Int. Cl.
*H04W 4/00* (2009.01)
*H04L 29/12* (2006.01)
*H04W 8/26* (2009.01)

(52) U.S. Cl.
CPC ...... *H04L 61/2015* (2013.01); *H04L 29/12311* (2013.01); *H04L 61/2084* (2013.01); *H04W 8/26* (2013.01)
USPC .......................................... 370/328; 370/401

(58) Field of Classification Search
None
See application file for complete search history.

(56) References Cited

U.S. PATENT DOCUMENTS

| | | | |
|---|---|---|---|
| 8,406,181 B2 | 3/2013 | Hanaoka et al. | |
| 2002/0191562 A1* | 12/2002 | Kumaki et al. | 370/331 |
| 2005/0099971 A1* | 5/2005 | Droms et al. | 370/328 |
| 2007/0268919 A1* | 11/2007 | Sarikaya et al. | 370/401 |
| 2010/0027509 A1* | 2/2010 | Velev et al. | 370/331 |

FOREIGN PATENT DOCUMENTS

| | | |
|---|---|---|
| EP | 1 603 287 A1 | 12/2005 |
| JP | 2004025391 A | 1/2004 |
| WO | 2007/145371 A1 | 12/2007 |
| WO | 2008018151 A1 | 2/2008 |

OTHER PUBLICATIONS

International Search Report, dated Dec. 30, 2009, from corresponding PCT application.

\* cited by examiner

*Primary Examiner* — Mohammad Adhami
(74) *Attorney, Agent, or Firm* — Young & Thompson

(57) ABSTRACT

A method for facilitating communication in a mobile communication system in which address-delegating entities are involved, wherein mobile nodes attaching to the communication system get assigned an address or address prefix, wherein the address or address prefix assignment is delegated from an entity being associated with mobility management—mobility entity—to some other configuration component (2), is characterized in that the configuration component (2), upon being delegated by a mobility entity to assign a mobile node an address or address prefix, stores information about the delegating mobility entity. Furthermore, a corresponding mobile communication system with discovery functionality of address-delegating entities is disclosed.

13 Claims, 3 Drawing Sheets

METHOD FOR FACILITATING COMMUNICATION IN A MOBILE COMMUNICATION SYSTEM AND MOBILE COMMUNICATION SYSTEM

FIELD OF THE INVENTION

The present invention relates to a method for facilitating communication in a mobile communication system in which address-delegating entities are involved, wherein mobile nodes attaching to said communication system get assigned an address or address prefix, wherein said address or address prefix assignment is delegated from an entity being associated with mobility management—mobility entity—to some other configuration component.

Furthermore, the present invention relates to a mobile communication system with address delegation support, including mobile nodes that get assigned an address or address prefix upon attachment to said communication system, one or more entities being associated with mobility management—mobility entities—, and at least one configuration component to which said address or address prefix assignment is delegated by said one or more mobility entities.

BACKGROUND OF THE INVENTION

Protocols for IP-based mobility management as being considered for future mobile communication networks are designed in such a way that assignment of IP addresses or IP address prefixes can be delegated from entities being associated with mobility management to another dedicated entity of the network, such as for example a server for Dynamic Host Configuration (e.g. DHCP servers) or Authentication and Authorization (e.g. AAA servers).

Prior art works that are relevant in connection with address delegation include the following documents:
Proxy Mobile IPv6 (draft-ietf-netlmm-proxymip6-11.txt)
DHCPv6 Based Home Network Prefix delegation for PMIPv6 (draft-sarikaya-netlmm-prefix-delegation-01.txt)
Requirements for IPv6 Prefix Delegation (IETF RFC 3769)
Radius Delegated-IPv6-Prefix Attribute (IETF RFC 4818).

For the sake of simplicity, addresses or address prefixes will be shortly referred to as 'address' hereinafter. Entities being associated with mobility management in a mobile communication system will be shortly referred to as 'mobility entity' hereinafter. Entities getting delegated address assignment functions from mobility entities will be referred to as 'configuration component'. Further, the term "communication" is to be understood in a broad sense and includes all kinds of data exchange between mobile network nodes, in particular voice, video and multimedia data.

Generally, to retrieve a valid address for an attaching mobile node, the mobility entity which ensures reachability of mobile nodes requests the configuration component for a valid IP address. In return, the configuration component provides the mobile node an IP address and stores the mobile node's identifier together with the assigned IP address in its local database. Therefore, according to the configuration components' database entries, a mobile node can always be linked to the assigned address (or prefix).

FIG. 1 depicts a mobile communication system 1, where two mobile devices—mobile node A and mobile node B—get registered with different mobility entities being denoted mobility entity A and B. Both mobility entities A and B delegate address (or address prefix) assignment to a configuration server, respectively. In the depicted scenario both mobility entities A and B have chosen the same configuration server.

More specifically, in a first step (denoted step A1 and B1, respectively) each mobile node sends a registration request to the respective mobility entity. Alternatively, a network entity (e.g. mobility gateway according to Proxy Mobile IPv6) takes over the role of the mobile node to send such registration request to the mobility entity. In steps A2 and B2, respectively, the mobility entities A and B delegate address assignment to the configuration server. The configuration server assigns addresses 'Addr A' (for mobility entity A) and 'Addr B' (for mobility entity B) and provides them back to the requesting entity, as illustrated in steps A3 and B3, respectively. To complete the registration procedure, mobility entity A (and B, respectively) sends a registration reply to mobile node A (to mobile node B, respectively) including the assigned address 'Addr A' ('Addr B', respectively), which is depicted in FIG. 1 in step A4 (step B4, respectively). Alternatively, the registration reply is sent to the network entity, which sent the request on behalf of the mobile node. In such case, this network entity forwards the assigned address to the mobile node.

In the specific scenario described in connection with FIG. 1 problems might arise, for instance, when mobile node A intends to send a packet to mobile node B. In this case all data traffic would take a default predefined path through both mobility entities. Such default routing path might be unfavorable and could possibly lead to network resources being unduly wasted. Even worse, the default path might soon get overloaded.

SUMMARY OF THE INVENTION

It is therefore an object of the present invention to improve and further develop a method for facilitating communication in a mobile communication system and a mobile communication system of the initially described type in such a way that communication in a topology with multiple mobility entities is enabled in a reliable and efficient way.

In accordance with the invention the aforementioned object is accomplished by a method characterized in that said configuration component, upon being delegated by a mobility entity to assign a mobile node an address or address prefix, stores information about said delegating mobility entity.

Furthermore, the aforementioned object is accomplished by a mobile communication system characterized that said configuration component is configured, upon being delegated by a mobility entity to assign a mobile node an address or address prefix, to store information about said delegating mobility entity.

According to the invention it has first been recognized that in some mobile communication networks, in particular in networks deploying network-based mobility management, discovery of mobility entities, which delegated the assignment of an address to an attaching mobile node to a configuration server, might be necessary. In the scenario of FIG. 1 mobility entity A may need to find out who is the mobility entity of the packet's destination node (i.e. of mobile node B). It has been further recognized that this information would be helpful, for instance, with respect to realizing route optimizations under control of mobility entities in such a way that a traffic source's mobility entity discovers and signals to a destination's mobility entity. Setting up the aforementioned optimized path can then take place under the control of both mobility entities.

According to the exemplary application scenario of FIG. 1, the information about mobile node B's mobility entity may serve as further information to take routing decisions for mobile node A's packets towards mobile node B.

In general, the present invention deals with the discovery of mobility anchors through the configuration server by means of resolving a mobile node's address into the associated mobility anchor's (i.e. mobility entity's) address. Such resolution of a mobile node's address into its mobility anchor address, which requested address delegation for the mobile node, has not been considered so far in state of the art solutions for address assignment.

Against this background, when a mobility entity delegates an address assignment for a mobile node to a configuration component, the present invention proposes that the configuration component stores information about the delegating mobility entity. For example, with help of this information a source node's mobility entity is enabled to directly contact a destination node's mobility entity, so that route optimization can be realized under full control of the mobility entities without the configuration components being involved. The proposed method facilitates discovery of delegating nodes, which will be essential for realizing advanced mobility management in future mobile communication networks, such as e.g. for route optimization support.

According to a preferred embodiment, the configuration component is a Dynamic Host Configuration (DHC) server or an Authentication and Authorization Server. This kind of servers is already prevalent in existing mobile communication networks. This means that no new dedicated entities are required but the functionality of already existing servers only has to be extended.

Advantageously, the configuration component comprises a database in which the additional information about delegating mobility entities is stored. Consequently, the configuration server can easily access the data when receiving requests from other network nodes.

According to a preferred embodiment, the information stored by the configuration component includes an IP address and/or an identifier of each mobility entity that has delegated address assignment to the configuration component. Maintenance of such additional information in the configuration server's database entries about delegating entities like a routable IP address of the mobility entity allows permanent and straightforward addressing of the mobility entity by other nodes of the network.

Furthermore, it may be provided that the information stored by the configuration component includes information about the address or address prefix assigned to a mobile node and/or information about the mobile node's identifier. By means of this binding information a mobile node can always be linked to the assigned address as well as to the respective delegating mobility entity.

In particular with respect to an efficient preparation of route optimization, a mobility entity, upon receiving a data packet from a source node directed to a destination node, may contact the configuration component to request information about the mobility entity that has delegated assignment of the destination node's address or address prefix. Advantageously, the input parameters for the request include at least the destination node's full individual IP address or address prefix and/or the destination node's identifier. This information enables the configuration component to easily search its database for the requested information.

In a next step it may be provided that the configuration component, upon receipt of the request, retrieves the requested information from its database entries and provides it back to the requesting mobility entity. The provision of the requested delegating entity information (e.g. its routable IP address) may be restricted to cases in which the request originates from a trusted network component.

With respect to setting up an optimized route, the requesting mobility entity may employ the information received from the configuration component to directly contact the mobility entity that has delegated assignment of the destination node's address or address prefix. By this means the requesting mobility entity gains full control of the optimized route set up process.

In larger networks it proves to be advantageous to realize a decentralized approach according to which multiple configuration components are provided in the communication system. In such cases a superordinate entity may be operated that is configured to manage the pools of addresses or address prefixes that can be assigned by each of the multiple configuration components. As concerns high reliability the superordinate entity may be updated every time a change in the pools of addresses or address prefixes occurs. For instance, if a mobile node, e.g. due to a location change, attaches to the network via another mobility entity that performs address delegation via another configuration component, this change will be reported to the superordinate entity either by the old configuration component (in the sense of a deregistration of the respective mobile node), by the new configuration component (in the sense of a registration of the mobile node), or by both of them.

Advantageously, the superordinate entity functions as a kind of redirect agent. This means that a mobility entity, upon receiving a data packet from a source node directed to a destination node, first contacts the superordinate entity to find out which of the configuration components of the system is responsible for the delegated assignment of the destination node's address or address prefix. Then, i.e. after having discovered the correct configuration component, the mobility entity may contact the identified configuration component to request information about the mobility entity that has delegated assignment of the destination node's address or address prefix.

With respect to an efficient communication among the mobility entities and the configuration servers, which is readily to implement, the deployment of specified interface protocols is proposed. Advantageously, the communication is performed via already existing protocols, like e.g. DHCP (Dynamic Host Configuration Protocol) according to RFC2131, RADIUS (Remote Authentication Dial-In User Service) according to RFC2865, or the so called 'diameter' protocol according to RFC3588.

There are several ways how to design and further develop the teaching of the present invention in an advantageous way. To this end, it is to be referred to the patent claims subordinate to patent claims 1 and 14 on the one hand and to the following explanation of preferred examples of embodiments of the invention, illustrated by the drawing on the other hand. In connection with the explanation of preferred embodiments of the invention by the aid of the drawing, generally preferred embodiments and further developments of the teaching will be explained. In the drawings

DETAILED DESCRIPTION OF THE INVENTION

Figure 2:
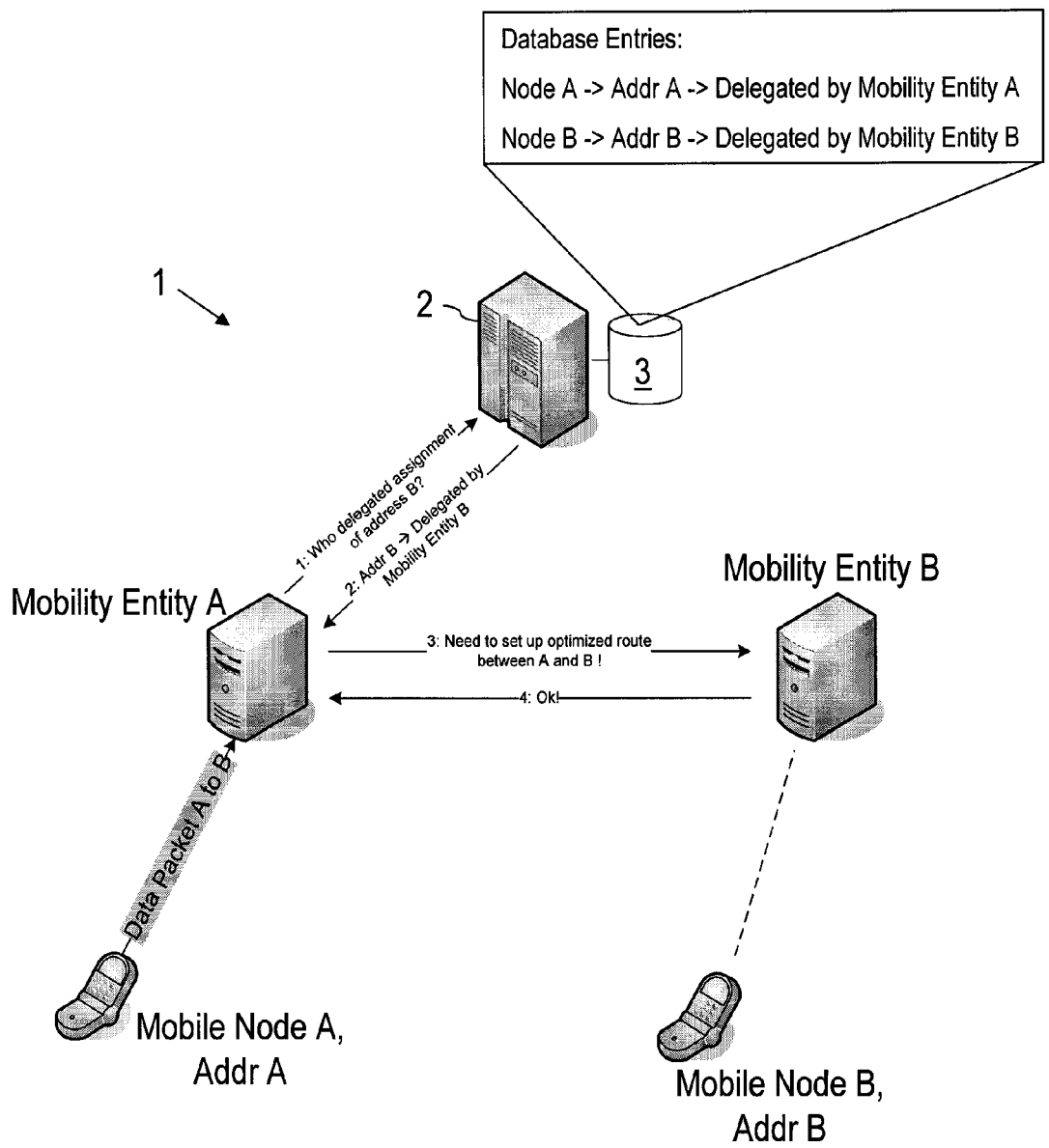
FIG. 2 illustrates a route optimization based on the discovery of mobility entities according to an embodiment of the present invention.

FIG. 2 illustrates a mobile communication system 1 according to one embodiment of the present invention in which mobility entities discover each other with the help of a configuration server 2.

Figure 1:
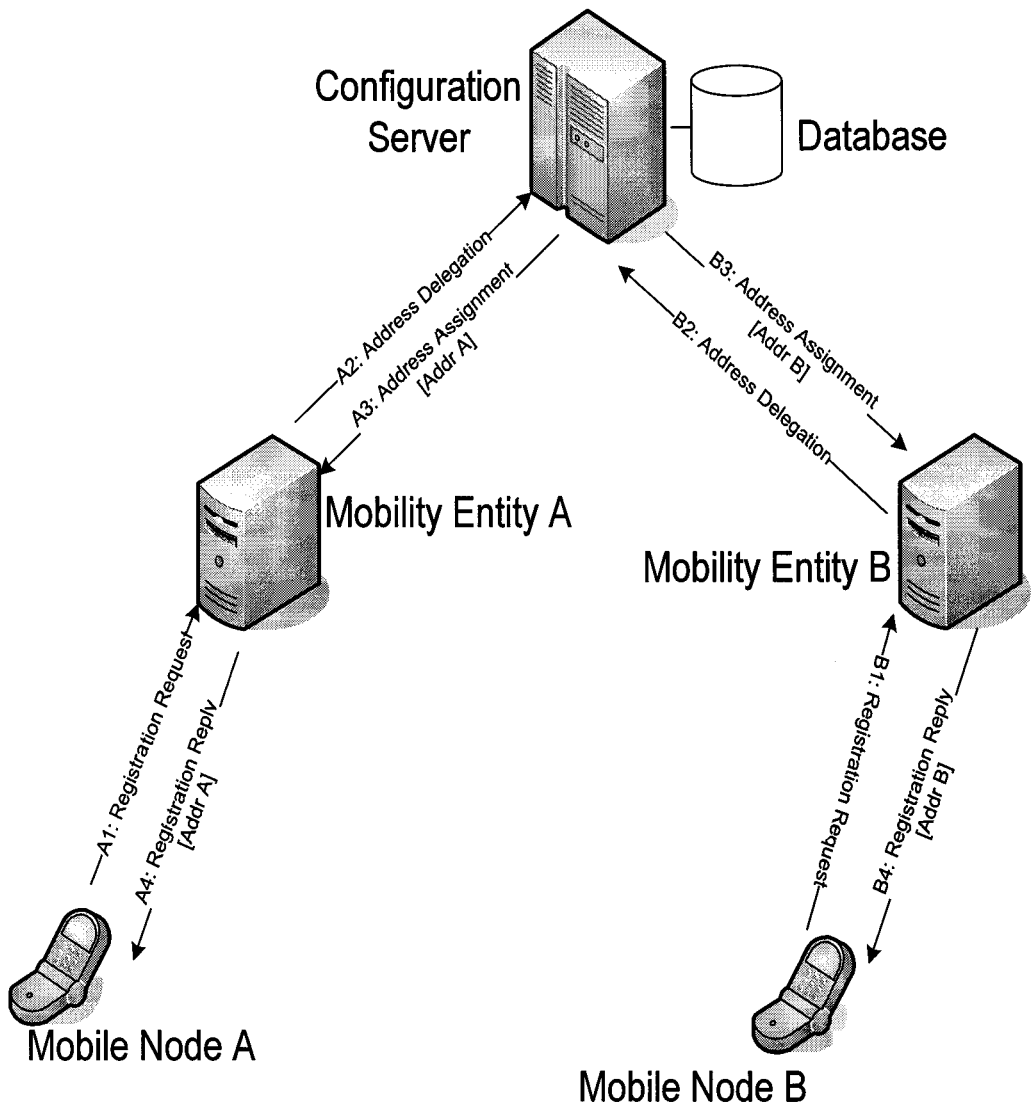
FIG. 1 is a schematic view of an address delegation procedure during registration of mobile devices with mobility entities according to a state of the art implementation.

In the scenario of FIG. 2 it is assumed that mobile node A and mobile node B have already performed the registration and address delegation and assignment procedure as described in connection which FIG. 1. Consequently, mobile node A is registered with mobility entity A, which has delegated address assignment to configuration server 2. Mobile node A has been assigned the address 'Addr A'. Similarly, mobile node B is registered with mobility entity B, which has also delegated address assignment to configuration server 2. Mobile node B has been assigned the address 'Addr B'.

In accordance with the invention, the configuration component 2 stores information about delegating mobility entities A and B. More specifically, when mobility entity A delegated address assignment for mobile node A to the configuration server 2, configuration server 2 stored the IP-address of mobility entity A in its database 3. Consequently, the database 3 of configuration server 2 includes a binding entry that links together mobile node A, mobile node A's address 'Addr A', and the IP-address of delegating mobility entity A. Correspondingly, the same applies for mobile node B. Thus, the configuration server 2 has all addresses and IDs in its database 3, which thus functions as global database that includes all information relevant with respect to mobility entity discovery.

Based on the presetting as outlined above, the scenario illustrated in FIG. 2 starts with mobile node A sending a data packet to mobile node B via mobility entity A. To avoid that the entire data traffic is routed via both mobility entities, i.e. via mobility entity A and via mobility entity B, mobility entity A tries to resolve mobile node B's address into an address of mobile node B's mobility entity B. To this end mobility entity A sends a corresponding request to the configuration server 2 (as illustrated in step 1). The configuration server 2, which functions as database management entity, retrieves the requested information from its extended database 3 and provides an associated information about mobility entity B back to mobility entity A (indicated in step 2).

With the information about the identity of mobility entity B received from the configuration server 2, mobility entity A is enabled to contact mobility entity B directly (indicated in step 3). A reason for such contact may be for example, but not limited to, to control the setup of an optimized route between mobile node A and mobile node B. In particular, as a result of an optimized route setup data packets directed from mobile node A to mobile node B may be routed directly between the access networks of mobile A and mobile node B, respectively, without traversing the mobile nodes' mobility entities. Details about the signaling between mobility entities to set up optimized routes are out of scope of this description.

Furthermore, the received information (e.g. address) about mobility entity B may serve for mobility entity A as indication to find the data packet's next hop on the routing path towards mobility node B. In this connection it is important to note the mobile node B's address might be a virtual IP address. This makes it in particular difficult to derive a routable IP address of the associated mobility entity, as the IP address prefix of the mobile node may not match the mobility entity's IP address prefix. The additional information stored in the configuration server's 2 database 3 about mobility entity B enables mobility entity A to resolve this virtual IP address into a topologically correct and routable IP address of mobility entity B.

As indicated in step 4, mobility entity B confirms the request received from mobility entity A, thereby establishing an optimized routing path between mobility node A and mobility node B that avoids traffic being routed via the mobility entities A and B. Consequently, the exemplary use case of route optimization described in connection with FIG. 2 off-loads traffic from the mobility entities A and B.

Figure 3:
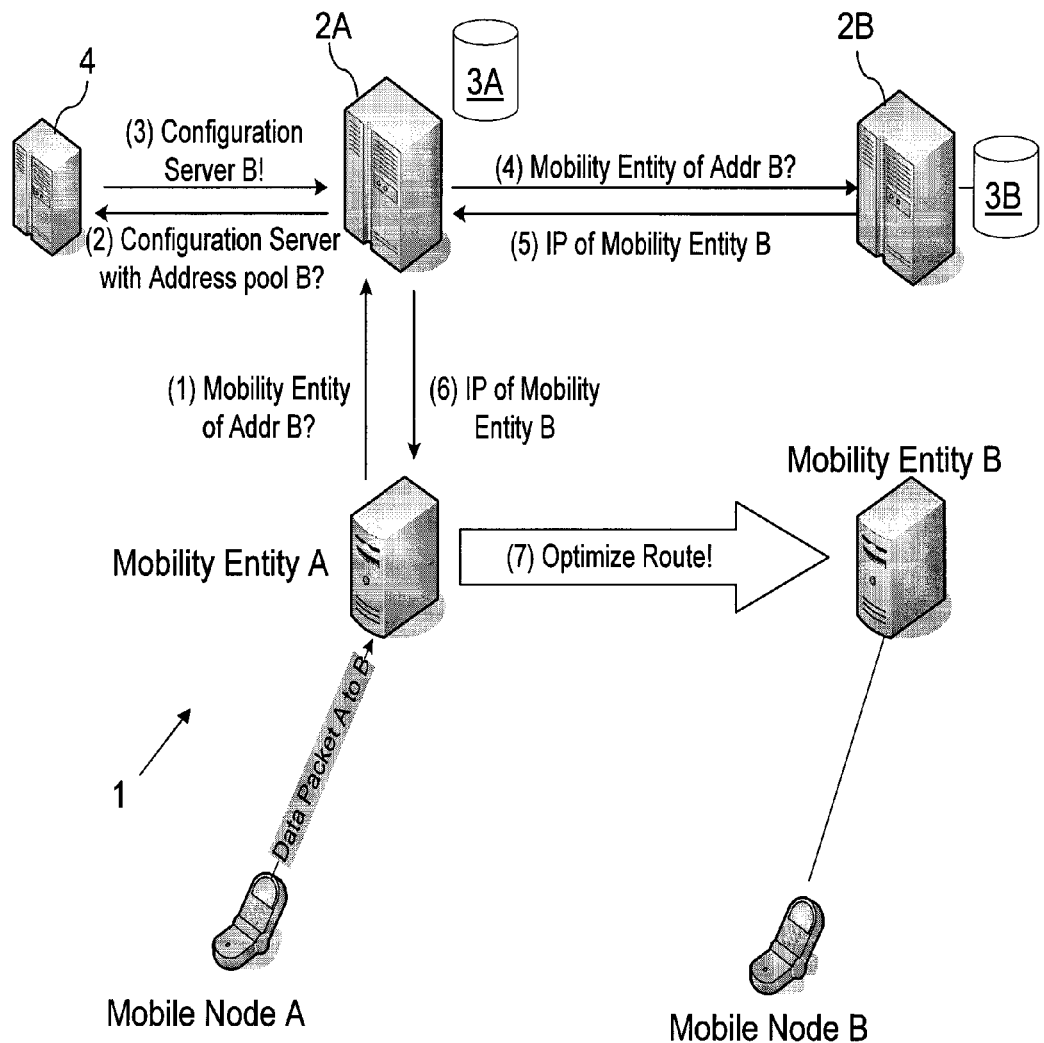
FIG. 3 illustrates the discovery of mobility entities with the help of multiple configuration servers according to another embodiment of the present invention.

FIG. 3 illustrates a mobile communication system 1 including multiple configuration servers, two of which 2A, 2B are depicted in FIG. 3. Again, as in FIG. 2, mobile node A is registered with mobility entity A, and mobile node B is registered with mobility entity B. In contrast to the embodiment of FIG. 2, both mobility entities A and B have chosen different configuration servers for delegation address assignment. Mobility entity A has chosen configuration server 2A, whereas mobility entity B has chosen configuration server 2B. In accordance with the present invention both configuration servers 2A and 2B have stored information about the address delegating entities A and B, respectively, in each mobile node's database entry.

When mobility entity A receives a data packet from mobile node A directed to mobile node B, it will contact its configuration server A with the query who delegated the assignment of address B (step 1). The configuration server A realizes that its database entries do not include any binding information related to address B. Consequently, configuration server A contacts a redirect agent or server 4, and queries the configuration server that possesses the address pool containing address B of mobile node B (as indicated in step 2).

The redirect agent 4 functions as superordinate entity that has the knowledge of the address pools each configuration server 2A, 2B of the communication system 1 can assign. The redirect agent 4 should be updated every time there is a change in those addresses. Being thus configured, the redirect agent 4 can be used in order to find out which configuration server is responsible for the mobility entity with the given delegated address.

As illustrated in step 3 the redirect agent 4 reports to the configuration server 2A that configuration server 2B is the configuration component that has been delegated for the assignment of address B. In a next step (step 4) configuration server 2A contacts configuration server 2B and asks for the mobility entity of address B. Configuration server 2B reports back the IP-address of mobility entity B (step 5), which configuration server 2A forwards to mobility entity A (step 6). As already explained in connection with FIG. 2, mobility entity A can then directly contact mobility entity B, e.g. for route optimization purposes (step 7).

To summarize, the present invention generally allows network entities to discover information (IP address or identifier) of address delegating entities simply by referring to the address/prefix of the node, to which an IP address has been delegated. This allows mobility management related entities to contact each other, in case they delegate address/prefix assignment. Consequently, in a specific use case the present invention enables the setup of optimized routes between mobile terminals that are under control of mobility entities on a network based mobility scenario.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for facilitating communication between mobile nodes in a mobile communication system in which address-delegating entities are involved, wherein mobile nodes attaching to said communication system get assigned an address or address prefix, the method comprising
 delegating said address or address prefix assignment from each entity being associated with mobility management (mobility entity) of the mobile node to a single common configuration component, wherein said single common configuration component, upon being delegated by a mobility entity to assign a mobile node an address or address prefix, stores information about said delegating mobility entity,
 and wherein:
 said mobility entity contacts said configuration component to request information about the mobility entity that has delegated assignment of a destination node's address or address prefix;
 said configuration component retrieves the requested information from a database of entries and provides the retrieved information back to said requesting mobility entity; and
 said requesting mobility entity employs the information received from said configuration component to directly contact said mobility entity that has delegated assignment of said destination node's address or address prefix.

2. The method according to claim 1, wherein the information stored by said configuration component includes said delegating mobility entity's IP address and/or identifier.

3. The method according to claim 1, wherein the information stored by said configuration component includes information about the address or address prefix assigned to the respective mobile node.

4. The method according to claim 1, wherein the information stored by said configuration component includes information about the respective mobile node's identifier.

5. The method according to claim 1, wherein the mobility entity, upon receiving a data packet from a source node directed to a destination node, contacts said configuration component to request information about the mobility entity that has delegated assignment of said destination node's address or address prefix.

6. The method according to claim 1, wherein input parameters for said request include said destination node's IP address or address prefix and/or said destination node's identifier.

7. The method according to claim 1, wherein said direct contact serves to control the setup of an optimized route between said source node and said destination node.

8. The method according to claim 1, wherein communication between said mobility entity and said configuration component is performed by an interface protocol of DHCP (Dynamic Host Configuration Protocol, RFC2131), RADIUS (Remote Authentication Dial-In User Service, RFC2865) or diameter (RFC3588).

9. A mobile communication system with discovery functionality of address-delegating entities, comprising:
 mobile nodes that get assigned an address or address prefix upon attachment to said communication system,
 one or more mobility entities associated with mobility management, and
 a common configuration component to which said address or address prefix assignment is delegated by said one or more mobility entities,
 wherein said configuration component is configured, upon being delegated by a mobility entity to assign a mobile node an address or address prefix, to store information about said delegating mobility entity, and
 said one or more mobility entity is configured to contact said configuration component to request said stored information about a mobility entity that has delegated assignment of a destination node's address or address prefix,
 and wherein said configuration component is configured to retrieve said requested information from a database of entries and to provide the retrieved information back to said requesting mobility entity, and
 said requesting mobility entity is configured to employ the information received from said configuration component to directly contact said delegating mobility entity.

10. The system according to claim 9, wherein said configuration component is a Dynamic Host Configuration Server or an Authentication and Authorization server.

11. The system according to claim 9, wherein said configuration component comprises a database in which said information is stored.

12. The method according to claim 1, wherein the information stored by said configuration component includes said delegating mobility entity's IP address and/or identifier, information about the address or address prefix assigned to the respective mobile node, and information about the respective mobile node's identifier.

13. A method for facilitating communication between mobile nodes in a mobile communication system in which address-delegating entities are involved, wherein mobile nodes attaching to said communication system get assigned an address or address prefix, the method comprising:
 delegating said address or address prefix assignment from each mobility entity being associated with mobility management of the mobile node to a single common configuration component, wherein said configuration component, upon being delegated by the mobility entity to assign the mobile node an address or address prefix, stores information comprising the IP address and/or identifier of the delegating mobility and the address or address prefix assigned to the respective mobile node;
 upon a mobility entity receiving a data packet from a source node directed to a destination node, said mobility entity contacts said configuration component to request information about the mobility entity that has delegated assignment of said destination node's address or address prefix;
 said configuration component, upon receipt of said request, retrieves the requested information from a database of entries and provides the retrieved information back to said requesting mobility entity; and
 said requesting mobility entity employs the information received from said configuration component to directly contact said mobility entity that has delegated assignment of said destination node's address or address prefix, wherein said direct contact serves to control the setup of an optimized route between said source node and said destination node.

* * * * *